(12) United States Patent
Larson

(10) Patent No.: US 10,138,926 B2
(45) Date of Patent: Nov. 27, 2018

(54) TELESCOPING TORQUE TUBE ASSEMBLY

(71) Applicant: Moog Inc., East Aurora, NY (US)

(72) Inventor: Lowell Van Lund Larson, Huntington Beach, CA (US)

(73) Assignee: Moog Inc., Elma, NY (US)

( * ) Notice: Subject to any disclaimer, the term of this patent is extended or adjusted under 35 U.S.C. 154(b) by 535 days.

(21) Appl. No.: 14/840,000

(22) Filed: Aug. 30, 2015

(65) Prior Publication Data

US 2017/0058939 A1    Mar. 2, 2017

(51) Int. Cl.
*F16C 3/03* (2006.01)

(52) U.S. Cl.
CPC ............ *F16C 3/03* (2013.01); *F16C 2226/76* (2013.01)

(58) Field of Classification Search
CPC ..... Y10T 403/32467; Y10T 403/32475; Y10T 403/32483; Y10T 40/7077; Y10T 403/32254; Y10T 403/32426; Y10T 403/32442; Y10T 403/32451; Y10T 403/32524; Y10T 403/7091; F16C 3/03; F16C 2226/76; F16D 3/848; F16L 37/096; F16L 37/098; F16L 37/0985; F16L 37/1205; F16L 37/133; F16B 7/10; F16B 7/105
USPC ............ 403/109.1, 109.2, 109.3, 109.5, 277, 403/279–283, 359.1; 464/127; 180/380
See application file for complete search history.

(56) References Cited

U.S. PATENT DOCUMENTS

| 2,467,795 | A |   | 4/1949  | White    |              |
|-----------|---|---|---------|----------|--------------|
| 4,124,119 | A |   | 11/1978 | Nordstrom |             |
| 4,807,351 | A | * | 2/1989  | Berg     | B21D 26/14   |
|           |   |   |         |          | 29/419.2     |
| 4,915,536 | A | * | 4/1990  | Bear     | F16D 1/068   |
|           |   |   |         |          | 403/265      |
| 4,989,905 | A | * | 2/1991  | Rajecki  | F16L 25/0045 |
|           |   |   |         |          | 285/319      |
| 5,039,139 | A | * | 8/1991  | McElroy  | F16L 37/0985 |
|           |   |   |         |          | 285/233      |
| 5,112,084 | A | * | 5/1992  | Washizu  | F16L 37/098  |
|           |   |   |         |          | 285/24       |
| 5,332,270 | A | * | 7/1994  | Petty    | B29C 33/485  |
|           |   |   |         |          | 285/319      |

(Continued)

FOREIGN PATENT DOCUMENTS

GB        411246    6/1937

*Primary Examiner* — Amber R Anderson
*Assistant Examiner* — Nahid Amiri
(74) *Attorney, Agent, or Firm* — Hodgson Russ LLP

(57) ABSTRACT

A low-cost, lightweight telescoping torque tube assembly is reliable, safe, and easy to operate. The assembly has no loose fasteners, and no tools are required to operate the telescoping assembly. The telescoping torque tube assembly has only two parts, namely an end fitting and a torque tube. A resiliently deflectable locking tab is provided on one of the parts, and the locking tab is received by a corresponding locking slot formed in the other part. The locking tab has an abutment edge, and the locking slot has a limit edge facing the abutment edge for engaging the abutment edge when the locking tab is undeflected to prevent axially directed adjustment of the end fitting relative to the torque tube from an extended position toward a retracted position. A user deflects the locking tab to enable adjustment of the end fitting from the extended position to the retracted position.

7 Claims, 5 Drawing Sheets

(56) References Cited

U.S. PATENT DOCUMENTS

| | | | | |
|---|---|---|---|---|
| 5,361,283 A * | 11/1994 | Attix | | G21C 3/334 |
| | | | | 285/307 |
| 5,367,548 A | 11/1994 | Attix | | |
| 5,422,437 A * | 6/1995 | Schnell | | H02G 3/0691 |
| | | | | 174/153 R |
| 5,437,566 A * | 8/1995 | Zinn | | H01R 13/113 |
| | | | | 439/839 |
| 5,857,718 A * | 1/1999 | Kleinschmidt | | F16L 37/144 |
| | | | | 285/305 |
| 5,918,913 A * | 7/1999 | Lewis | | F16L 37/0985 |
| | | | | 285/148.14 |
| 6,250,838 B1 * | 6/2001 | Dann | | F16B 7/105 |
| | | | | 211/103 |
| 6,390,925 B1 * | 5/2002 | Perrow | | F16D 1/112 |
| | | | | 403/316 |
| 6,494,636 B1 * | 12/2002 | Mozena | | A63C 11/221 |
| | | | | 403/109.2 |
| 6,860,013 B1 * | 3/2005 | Durand | | B23K 13/015 |
| | | | | 219/611 |
| 6,958,054 B2 * | 10/2005 | Fitzgerald | | A61M 25/0631 |
| | | | | 604/162 |
| 7,237,796 B2 * | 7/2007 | Barker | | B60R 21/276 |
| | | | | 280/728.2 |
| 7,344,166 B2 * | 3/2008 | Ketcham | | F16L 37/0987 |
| | | | | 285/305 |
| 7,896,404 B2 * | 3/2011 | Hull | | F16L 37/0987 |
| | | | | 285/148.23 |
| 8,161,619 B2 * | 4/2012 | Wanthal | | B64C 1/06 |
| | | | | 29/460 |
| 9,149,621 B2 * | 10/2015 | Bizup | | A61M 39/1011 |
| 2005/0011299 A1 * | 1/2005 | MacAulay | | B60N 2/66 |
| | | | | 74/502 |
| 2007/0212167 A1 * | 9/2007 | Chiang | | B25G 3/28 |
| | | | | 403/359.1 |
| 2010/0268234 A1 | 10/2010 | Aho | | |
| 2013/0174398 A1 * | 7/2013 | Reinhart | | F16D 1/10 |
| | | | | 29/428 |

\* cited by examiner

TELESCOPING TORQUE TUBE ASSEMBLY

FIELD OF THE INVENTION

The present invention relates generally to torque tubes (sometimes referred to as torque shafts) used on an aircraft utility or flight control drive line, or on any drive line that requires a telescoping torque tube.

BACKGROUND OF THE INVENTION

A telescoping torque tube is a type of shaft used in drive lines that can be temporarily shortened in length by moving an end fitting on the torque tube from an extended position to a retracted position to facilitate installation or removal of the torque tube. In order for the torque tube to function properly, the telescoping end fitting must be locked in the extended position. Torque is commonly transmitted between the torque tube and end fitting by meshed splines on the torque tube and end fitting.

There are several known ways of releasably locking an end fitting at an extended position on a torque tube. One technique simply uses a cross bolt to lock the end fitting to the torque tube. The installer inserts the cross bolt transversely through aligned holes in axially overlapping end portions of the end fitting and the torque tube and uses the required tools to tighten the bolt. Typically, the cross bolt only restrains axial motion of the end fitting, and torque is transmitted by meshed splines, unless the torque carried by the torque tube is very low. The cross bolt must be removed to shorten the telescoping assembly.

Another technique uses an axially arranged internal spring acting between the torque tube and the end fitting to bias the end fitting toward the extended position. The end fitting and torque tube may be configured such that the end fitting can be locked in the extended and retracted positions by relative rotation between the end fitting and the torque tube about a longitudinal axis of the torque tube, and can be unlocked by relative counter-rotation. To shorten the telescoping torque tube assembly, the installer may rotate the end fitting to unlock it from the extended position, and then push the end fitting to the retracted position.

Another known technique employs a spring-loaded radially extending detent pin arranged to lock the end fitting of a telescoping torque tube assembly from axial movement. The installer presses the spring detent pin to stop the interference between the pin and the end fitting and allows axial movement of the end fitting.

These state of the art approaches for coupling an end fitting to a torque tube in a telescoping torque tube assembly require additional parts beyond the torque tube and end fitting, thereby adding weight and cost to the assembly while diminishing its reliability. The procedure to retract the end fitting may be time consuming, may require tools, and may involve loose fasteners.

SUMMARY OF THE INVENTION

The present invention provides a low-cost, lightweight telescoping torque tube assembly that is reliable, safe, and easy to operate. The assembly has no loose fasteners, such as nuts, bolts, cotter pins, snap rings, etc., that can be dropped or lost. No tools are required to operate the telescoping assembly. The telescoping torque tube assembly of the invention has only two parts, namely an end fitting and a torque tube.

In a first embodiment of the invention, a resiliently deflectable locking tab is provided on the torque tube, and the end fitting includes a locking slot arranged for receiving the locking tab when the end fitting is in an extended position. The locking tab has an abutment edge, and the locking slot has a limit edge facing the abutment edge of the locking tab for engaging the abutment edge when the locking tab is in an undeflected state to prevent axially directed adjustment of the end fitting relative to the torque tube from the extended position toward a refracted position. The locking tab is deflectable by a user such that the abutment edge of the locking tab is not faced by the limit edge of the locking slot, thereby permitting axially directed adjustment of the end fitting relative to the torque tube from the extended position to the retracted position.

In a second embodiment of the invention, the location of the locking tabs and locking slots is reversed (i.e. the locking tabs are on the end fitting and the locking slots are formed in the torque tube).

The locking tabs may be configured to have a pair of abutment edges and the locking slot may have a pair of limit edges to provide locking in both axial directions so that the end fitting is locked from adjustment toward the retracted position and is also retained on the torque tube. Alternatively, separate retainer tabs and retainer slots may be provided to restrict movement of the end fitting in a direction tending to separate the end fitting from the torque tube.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION OF THE INVENTION

Figure 1:
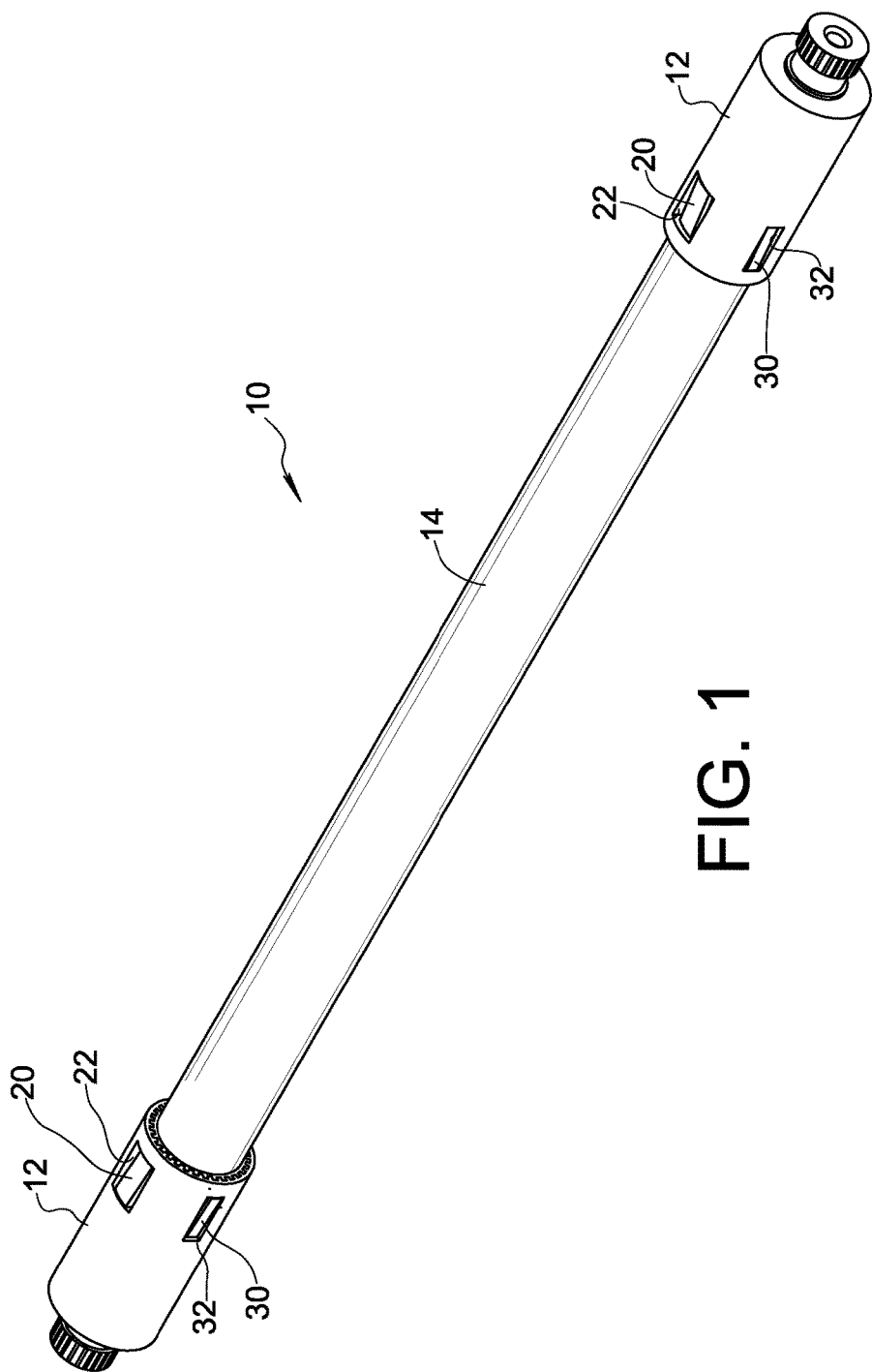
FIG. 1 is a perspective view showing a telescoping torque tube assembly formed in accordance with a first embodiment of the present invention.
Figure 2:
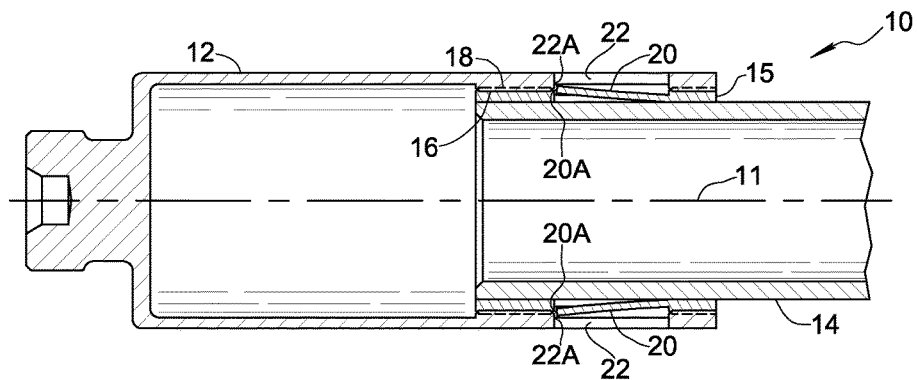
FIG. 2 is a cross-sectional view of one end of the telescoping torque tube assembly, wherein an end fitting of the torque tube assembly is locked in an extended position.

FIGS. 1 and 2 show a telescoping torque tube assembly 10 incorporating an apparatus for telescopically coupling end fittings 12 of the assembly to a torque tube 14 of the assembly in accordance with a first embodiment of the present invention. FIG. 1 shows the entire assembly 10 having an end fitting 12 at each opposite end region of torque tube 14. Assembly 10 has a longitudinal adjustment axis 11 along which end fittings 12 are telescopically adjustable relative to torque tube 14. The overlapping end regions of end fittings 12 and torque tube 14 include meshed splines 16 and 18 for transmitting torque between end fittings 12 and torque tube 14. In the description that follows, the apparatus for coupling one of the end fittings 12 to a mating end region of torque tube 14 is described in detail, it being understood that the end fitting at the opposite end of torque tube 14 may be coupled in mirror image fashion.

In FIG. 2, end fitting 12 is locked in its extended position, which is the position end fitting 12 is in during normal operation of torque tube assembly 10. In the illustrated embodiment, a pair of resiliently deflectable locking tabs 20 are provided on torque tube 14. Each locking tab 20 extends in an axial direction of torque tube 14 and is bent slightly outward in a radial direction of the torque tube. Each locking tab 20 has an abutment edge 20A. End fitting 12 includes a pair of locking slots 22 arranged for respectively receiving the pair of locking tabs 20. Each locking slot 22 has a limit edge 22A facing the abutment edge 20A of the corresponding locking tab 20 for engaging the abutment edge when the locking tab is in an undeflected state. Consequently, axially directed retraction of end fitting 12 relative to torque tube 14 is prevented. As shown in FIG. 2, locking tabs 20 and spline 18 of torque tube 14 may be formed on a separate sleeve 15 that is fixed to an end region of the torque tube 14, for example by welding, to become part of the torque tube 14. Alternatively, locking tabs 20 and spline 18 may be formed integrally with torque tube 14. Spline 16 of end fitting 12 may be bottled bored into the inner wall of the end fitting.

Figure 3:
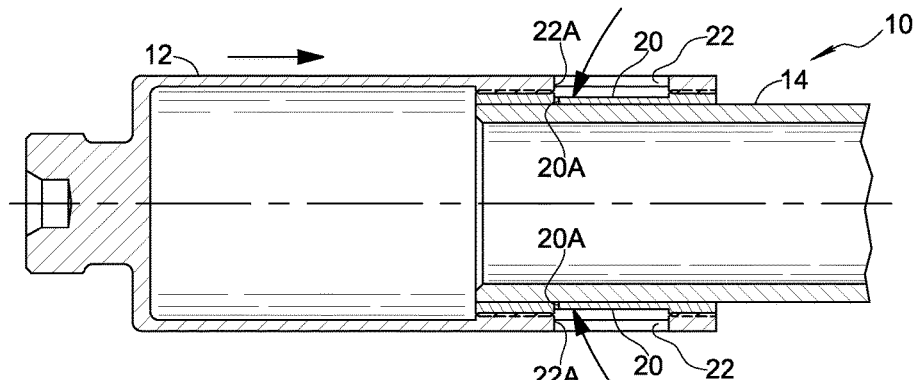
FIG. 3 is a cross-sectional view similar to that of FIG. 2, illustrating deflection of a pair of locking tabs to unlock the end fitting for telescoping adjustment.
Figure 4:
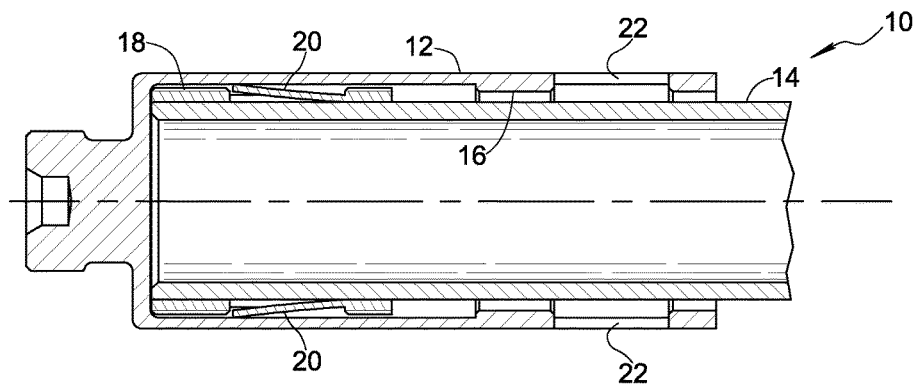
FIG. 4 is a cross-sectional view similar to that of FIG. 2, wherein the end fitting is shown in its retracted position.

FIGS. 3 and 4 illustrate how end fitting 12 may be unlocked and telescopically adjusted from the extended position to a retracted position suitable for installing or removing assembly 10 from a drive line. As indicated in FIG. 3, the pair of locking tabs 20 are simultaneously deflectable radially inward by a user, for example by manually pressing both locking tabs at the same time. This displaces the abutment edges 20A of the locking tabs 20 such that the abutment edges are not faced by limit edges 22A of locking slots 22, thereby enabling axially directed adjustment of end fitting 12 relative to torque tube 14 to the retracted position shown in FIG. 4. To facilitate simultaneous deflection of locking tabs 20, the locking tabs may be arranged diametrically opposite one another about axis 11.

End fitting 12 may be returned from the retracted position to the extended position. When end fitting arrives at the extended position, the resilient locking tabs 20 will once again be received by locking slots 22 as shown in FIG. 2.

Figure 5:
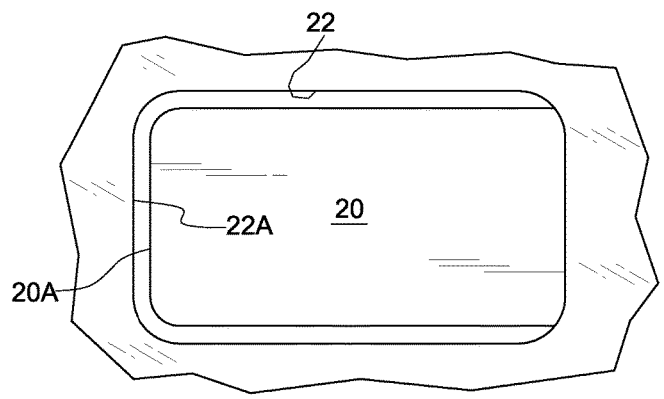
FIG. 5 is a plan view of one of the locking tabs and its associated locking slot.

FIG. 5 shows one of the locking tabs 20 in plan view. Locking tab 20 in FIG. 5 has the shape of a rectangular finger.

Figure 6:
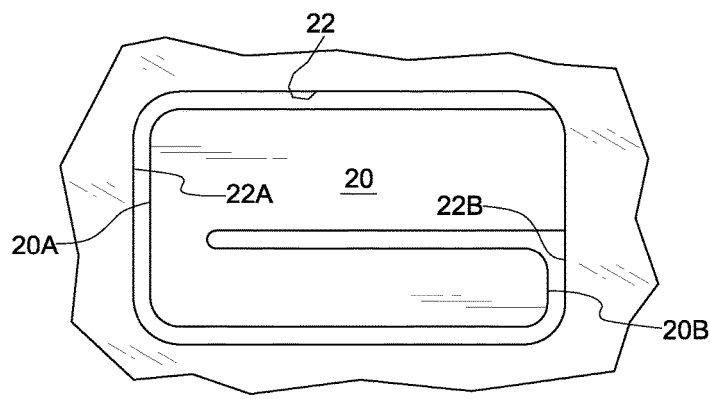
FIG. 6 is a view similar to that of FIG. 5, showing a locking tab having an alternative configuration.

FIG. 6 shows an alternative configuration of locking tab 20 wherein the locking tab loops around to have a "U" shape. The configuration shown in FIG. 6 is designed to prevent movement of end fitting 12 from the extended position to the retracted position, and to also limit movement of end fitting 12 in an opposite direction to prevent separation of end fitting 12 from torque tube 14. The U-shaped locking tab 20 has a first abutment edge 20A facing a first limit edge 22A of locking slot 22, and has a second abutment edge 20B facing a second limit edge 22B of locking slot 22. When end fitting 12 is in the extended position, further extending movement of end fitting 12 relative to torque tube 14 is blocked by engagement of second limit edge 22B with second abutment edge 20B, thereby preventing separation of end fitting 12 from torque tube 14.

Figure 7:
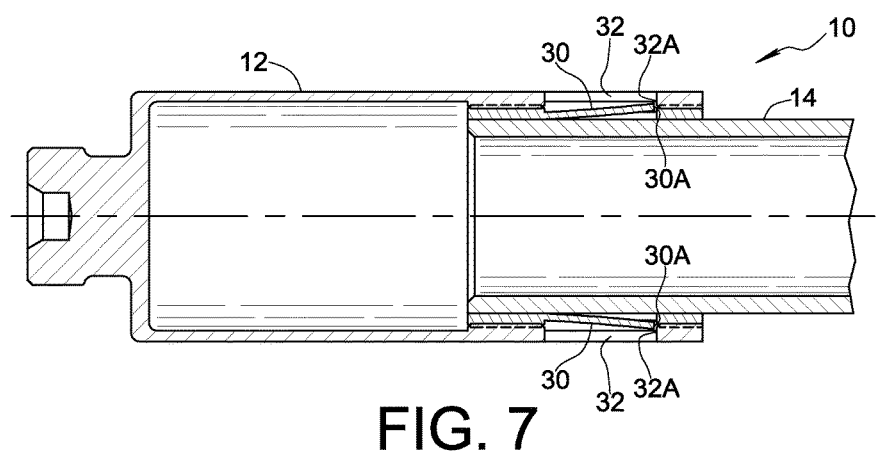
FIG. 7 is a cross-sectional view of the same end of the telescoping torque tube assembly shown in FIG. 2, wherein the sectioning plane is orthogonal to the sectioning plane of FIG. 2 to illustrate a pair of retainer tabs of the assembly for preventing separation of the end fitting from the torque tube when the end fitting is in the extended position.

FIGS. 1 and 7 illustrate an alternative approach to keeping end fitting 12 on torque tube 14. In this approach, a pair of resiliently deflectable retainer tabs 30 are provided on torque tube 14 and end fitting 12 has a corresponding pair of retainer slots 32 arranged for receiving the retainer tabs 30 when end fitting 12 is in the extended position. Each retainer tab 30 has an abutment edge 30A and each retainer slot has a limit edge 32A facing the abutment edge 30A of the retainer tab 30 for engaging the abutment edge when the retainer tab 30 is in an undeflected state. Retainer tabs 30 and retainer slots 32 are arranged to act in an opposite axial direction as compared to locking tabs 20 and locking slots 30, thus preventing axially directed separation of the end fitting from the torque tube. In the embodiment shown, retainer tabs 30 and retainer slots 32 are offset ninety degrees from locking tabs 20 and locking slots 22 about axis 11.

Figure 8:
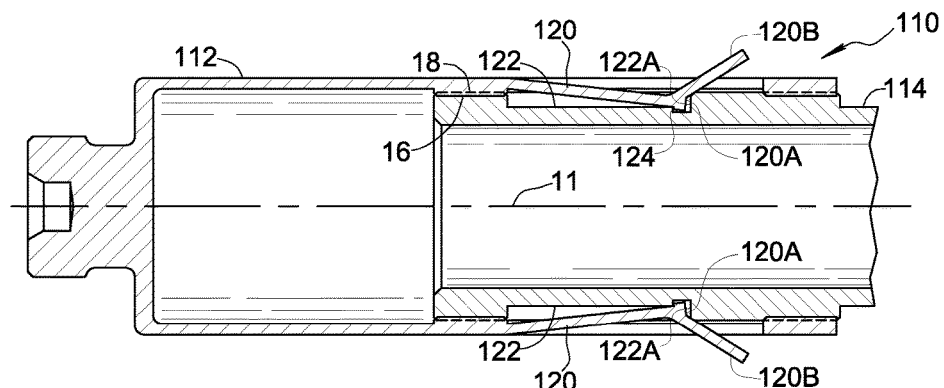
FIG. 8 is a cross-sectional view of one end of a telescoping torque tube assembly formed in accordance with a second embodiment of the present invention, wherein an end fitting of the torque tube assembly is locked in an extended position.
Figure 9:
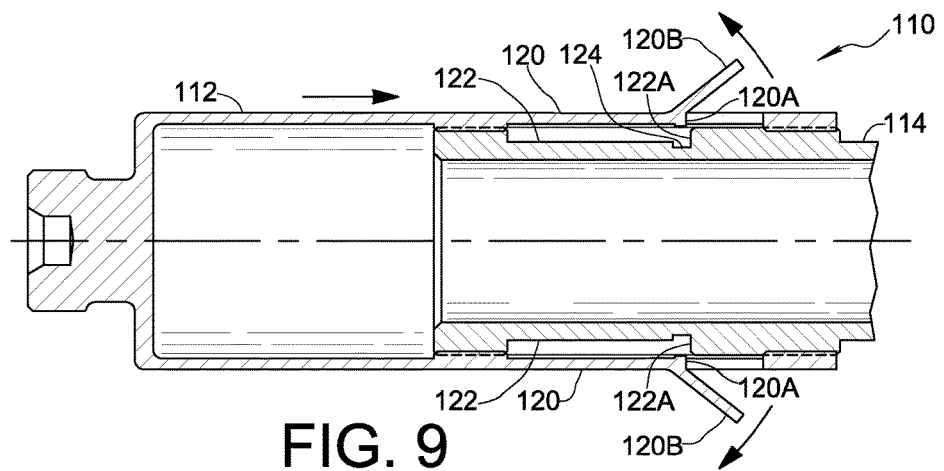
FIG. 9 is a cross-sectional view similar to that of FIG. 8, illustrating deflection of a pair of locking tabs to unlock the end fitting for telescoping adjustment.
Figure 10:
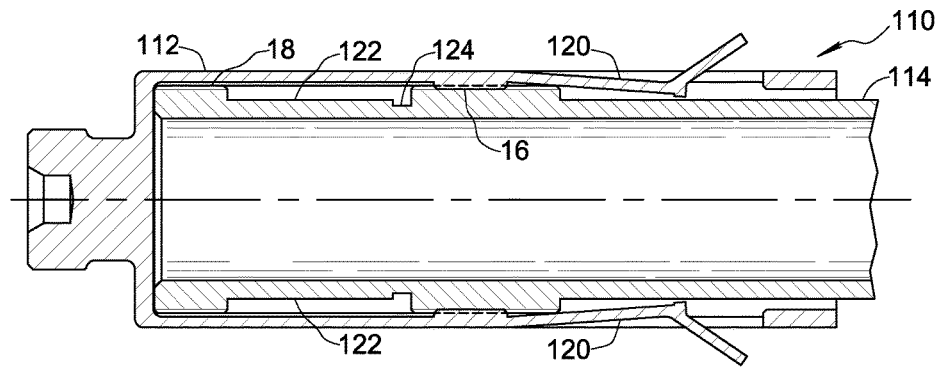
FIG. 10 is a cross-sectional view similar to that of FIG. 8, wherein the end fitting is shown in its retracted position.

FIGS. 8-10 illustrate a telescoping torque tube assembly 110 formed in accordance with a second embodiment of the present invention. Assembly 110 differs from assembly 10 of the first embodiment in that the locking tabs are provided on the end fitting instead of the torque tube, and the locking slots are provided on the torque tube instead of the end fitting.

In FIG. 8, an end fitting 112 is locked in its extended position, and a pair of resiliently deflectable locking tabs 120 are provided on the end fitting. Each locking tab 120 extends in an axial direction of torque tube 114 and is bent slightly inward in a radial direction of the torque tube. Each locking tab 120 has an abutment edge 120A. Torque tube 114 includes a pair of locking slots 122 arranged for respectively receiving the pair of locking tabs 120. Each locking slot 122 has a limit edge 122A facing the abutment edge 120A of the corresponding locking tab 120 for engaging the abutment edge when the locking tab is in an undeflected state. Consequently, axially directed retraction of end fitting 12 relative to torque tube 14 is prevented. Torque tube 114 may have a circumferential groove 124 for defining limit edge 122A and receiving an elbow region of locking tab 120 to ensure locking engagement.

FIGS. 9 and 10 illustrate how end fitting 112 may be unlocked and telescopically adjusted from the extended position to a retracted position suitable for installing or removing assembly 110 from a drive line. As indicated in FIG. 9, the pair of locking tabs 120 are simultaneously deflectable radially outward by a user. For example, locking tabs 120 may have a bent shape defining an outward leg 120B that can be manipulated by a user to withdraw the locking tab 120 from engagement. This displaces the abutment edges 120A of the locking tabs 120 such that the abutment edges are not faced by limit edges 122A of locking slots 122, thereby enabling axially directed adjustment of end fitting 112 relative to torque tube 114 to the retracted position shown in FIG. 10. Similar to the first embodiment, the locking tabs 120 may be arranged diametrically opposite one another to facilitate simultaneous deflection of both locking tabs.

Figure 11:
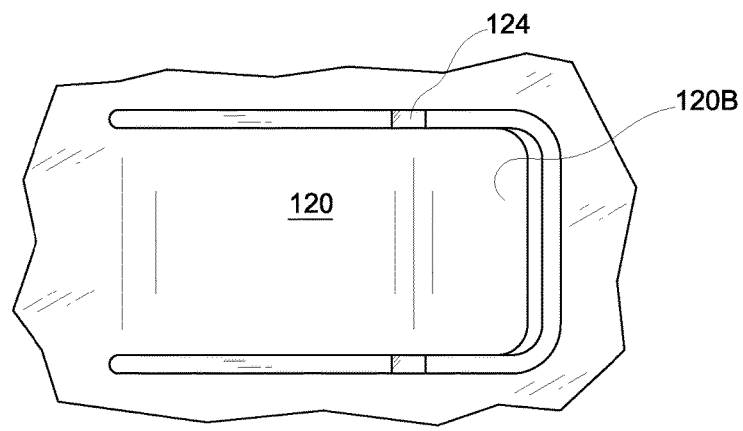
FIG. 11 is a plan view of one of the locking tabs of the torque tube assembly of FIGS. 8-10.

FIG. 11 shows one of the locking tabs 120 in plan view. Locking tab 120 in FIG. 11 has the shape of a rectangular finger.

Figure 12:
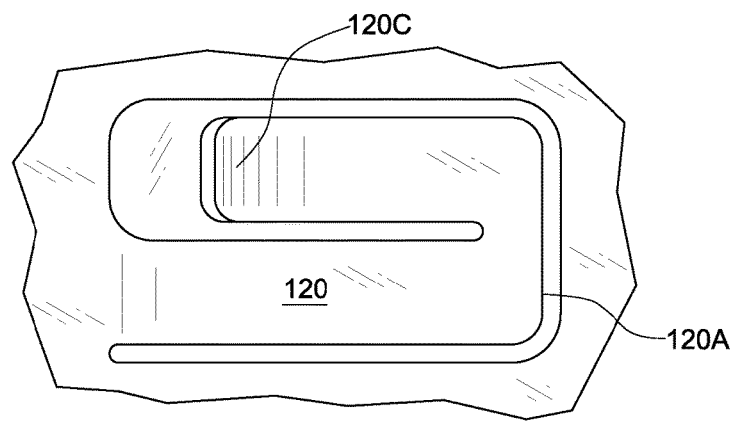
FIG. 12 is a view similar to that of FIG. 11, showing a locking tab having an alternative configuration.
Figure 13:
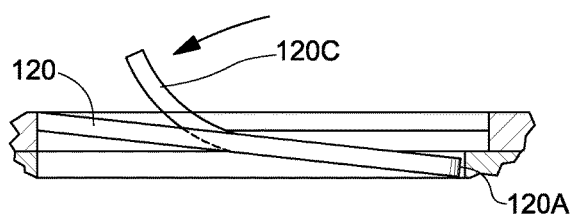
FIG. 13 is an elevational view of the locking table shown in FIG. 12.

FIGS. 12 and 13 show an alternative configuration of locking tab 120 intended to allow a user to disengage the locking tab by pressing radially inward. wherein the locking tab loops around to have a "J" shape. A main leg of the "J" shape defines abutment edge 120A, while a secondary leg of the "J" shape includes a portion 120C that is curved radially outward. As may be understood, inward pressure applied to curved portion 120C will provide a camming action against torque tube 114, thereby lifting abutment edge 120A away from facing relationship with limit edge 122A to enable retraction of end fitting 112.

End fitting 112 may be retained on torque tube 114 using approaches that are analogous to those described above for the first embodiment. For example, locking tabs 120 may have two abutment edges cooperating with respective limit edges of locking slots 122 to restrict adjustment motion in both axial directions. As another example, at least one retainer tab and retainer slot may be provided separate from the locking tabs 120 and locking slots 122 to prevent separation of end fitting 112 from torque tube 114.

With respect to either assembly 10 of the first embodiment or assembly 110 of the second embodiment, those skilled in the art will understand that the number of locking tabs and corresponding locking slots may be varied, and may be as few as one. Those skilled in the art will further understand that the teachings herein may be adapted to a torque tube assembly wherein the end fitting 12, 112 is sized to be the male part and the torque tube 14, 114 is sized to be the female part. Material for making end fitting 12, 112 and torque tube 14, 114 may be selected based on strength requirements and weight restrictions. Steel and aluminum are common material choices.

While the invention has been described in connection with exemplary embodiments, the detailed description is not intended to limit the scope of the invention to the particular forms set forth. The invention is intended to cover such alternatives, modifications and equivalents of the described embodiment as may be included within the scope of the invention.

What is claimed is:

1. A torque tube assembly comprising:
   a torque tube including an end region;
   an end fitting telescopically coupled to the end region of the torque tube, the torque tube and the end fitting having a longitudinal adjustment axis along which the end fitting is adjustable between an extended position and a retracted position;
   a resiliently deflectable locking tab on the torque tube, the locking tab having an abutment edge;
   wherein the end fitting includes a locking slot arranged for receiving the locking tab when the end fitting is in the extended position, the locking slot having a limit edge facing the abutment edge of the locking tab for engaging the abutment edge of the locking tab when the locking tab is in an undeflected state to prevent axially directed adjustment of the end fitting relative to the torque tube from the extended position toward the retracted position;
   wherein the locking tab is deflectable by a user such that the abutment edge of the locking tab is not faced by the limit edge of the locking slot, thereby permitting axially directed adjustment of the end fitting relative to the torque tube from the extended position to the retracted position; and
   wherein the torque tube includes a torque tube spline and the end fitting includes an end fitting spline meshing with the torque tube spline when the end fitting is in the extended position.

2. The torque tube assembly according to claim 1, wherein the torque tube comprises a pair of the locking tabs and a corresponding pair of the locking slots.

3. The torque tube assembly according to claim 2, wherein the pair of locking tabs are arranged opposite one another about the adjustment axis.

4. The torque tube assembly according to claim 1, further comprising:
   a resiliently deflectable retainer tab on the torque tube, the retainer tab having abutment edge;
   wherein the end fitting includes a retainer slot arranged for receiving the retainer tab when the end fitting is in the extended position, the retainer slot having a limit edge facing the abutment edge of the retainer tab for engaging the abutment edge of the retainer tab when the retainer tab is in an undeflected state to prevent axially directed separation of the end fitting from the torque tube.

5. The torque tube assembly according to claim 1, wherein the locking tab is U-shaped and further has a second abutment edge, and the locking slot further has a second limit edge facing the second abutment edge of the locking tab for engaging the second abutment edge of the locking tab when the locking tab is in an undeflected state to prevent axially directed separation of the end fitting from the torque tube.

6. A torque tube assembly comprising:
   a torque tube including an end region;
   an end fitting telescopically coupled to the end region of the torque tube, the torque tube and the end fitting having a longitudinal adjustment axis along which the end fitting is adjustable between an extended position and a retracted position; and
   a resiliently deflectable locking tab on one of the torque tube and the end fitting, the locking tab having an abutment edge;
   wherein the other of the torque tube and the end fitting includes a locking slot arranged for receiving the locking tab when the end fitting is in the extended position, the locking slot having a limit edge facing the abutment edge of the locking tab for engaging the abutment edge of the locking tab when the locking tab is in an undeflected state to prevent axially directed adjustment of the end fitting relative to the torque tube from the extended position toward the retracted position;
   wherein the locking tab is deflectable by a user such that the abutment edge of the locking tab is not faced by the limit edge of the locking slot, thereby permitting axially directed adjustment of the end fitting relative to the torque tube from the extended position to the retracted position; and
   wherein the torque tube includes a torque tube spline and the end fitting includes an end fitting spline meshing with the torque tube spline when the end fitting is in the extended position.

7. The torque tube assembly according to claim 6, further comprising a resiliently deflectable retainer tab on the one of the torque tube and the end fitting, the retainer tab having abutment edge;

wherein the other of the torque tube and the end fitting includes a retainer slot arranged for receiving the retainer tab when the end fitting is in the extended position, the retainer slot having a limit edge facing the abutment edge of the retainer tab for engaging the abutment edge of the retainer tab when the retainer tab is in an undeflected state to prevent axially directed separation of the end fitting from the torque tube.

* * * * *